(12) United States Patent
Neighbour et al.

(10) Patent No.: US 12,505,448 B2
(45) Date of Patent: Dec. 23, 2025

(54) SYSTEMS AND METHODS FOR FRAUD PREVENTION IN MOBILE APPLICATION VERIFICATION DEVICE ENROLLMENT PROCESS

(71) Applicant: Capital One Services, LLC, McLean, VA (US)

(72) Inventors: Erik Neighbour, McLean, VA (US); Amirfarrokh Iranitalab, Lincoln, NE (US); Lesley Newton, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/232,175

(22) Filed: Aug. 9, 2023

(65) Prior Publication Data

US 2025/0053982 A1    Feb. 13, 2025

(51) Int. Cl.
*G06Q 20/40* (2012.01)
*G06Q 20/38* (2012.01)

(52) U.S. Cl.
CPC ..... *G06Q 20/4016* (2013.01); *G06Q 20/3821* (2013.01)

(58) Field of Classification Search
CPC .......................... G06Q 20/4016; G06Q 20/38
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Scott S Trotter
(74) *Attorney, Agent, or Firm* — KDW Firm PLLC; Andrew D. Kasnevich

(57) ABSTRACT

Systems and methods are directed to an improved fraud detection feature in Mobile Application Verification (MAV) device enrollment process. The proposed solution corresponds to a two-prong approach involving a strength factor evaluation of the authentication inputs provided during the initial enrollment process, and a computation of a number of trust parameters values from archived transactional records. A computational model supplemented with a machine learning process is then used to determine a device stability period as a function of the strength factor associated with the user provided authentication data and the computed trust factors.

20 Claims, 7 Drawing Sheets

(56) References Cited

U.S. PATENT DOCUMENTS

| | | |
|---|---|---|
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |

(56) References Cited

U.S. PATENT DOCUMENTS

| | | |
|---|---|---|
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Allen |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |

(56) References Cited

U.S. PATENT DOCUMENTS

| | | |
|---|---|---|
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0101348 A1* | 5/2003 | Russo ............... G06V 40/1335 713/185 |
| 2003/0167350 A1 | 9/2003 | Davis et al. |
| 2003/0208449 A1 | 11/2003 | Diao |
| 2003/0220876 A1 | 11/2003 | Burger et al. |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer et al. |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller et al. |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |

(56) References Cited

U.S. PATENT DOCUMENTS

| | | |
|---|---|---|
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef et al. |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0246272 A1* | 9/2013 | Kirsch .............. G06Q 20/401 705/44 |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein et al. |
| 2015/0088757 A1 | 3/2015 | Zhou et al. |
| 2015/0089586 A1 | 3/2015 | Ballesteros |
| 2015/0113271 A1 | 4/2015 | Jooste et al. |
| 2015/0134452 A1 | 5/2015 | Williams |
| 2015/0134513 A1 | 5/2015 | Olson et al. |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins et al. |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |

(56) References Cited

U.S. PATENT DOCUMENTS

| | | |
|---|---|---|
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0110870 A1* | 4/2020 | Girdhar .............. G06F 21/316 |
| 2020/0137066 A1 | 4/2020 | Erickson et al. |
| 2021/0004806 A1 | 1/2021 | Noe |
| 2021/0272098 A1 | 9/2021 | Delsuc et al. |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0141220 A1 | 5/2022 | Lind |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2516861 A | 2/2015 |
| GB | 2 551 907 | 1/2018 |
| GB | 2551907 A | 1/2018 |
| KR | 101508320 | 4/2015 |
| KR | 20150140132 A | 12/2015 |
| WO | 199910824 A1 | 3/1999 |
| WO | 0049586 A1 | 8/2000 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

(56) References Cited

OTHER PUBLICATIONS

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared-: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON AT Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

The International Search Report and Written Opinion mailed Oct. 29, 2024, for related Int. App. No. PCT/US2024/040954 (15 pages).

Author Unknown, "Global expansion of card tapping mobile OTP for security and convenience is imminent," Jun. 28, 2022, website: https://www.swidch.com/blogs/card-tapping-motp-blog.

Smart Card Alliance, "Co-Branded Multi-Application Contactless Cards for Transit and Financial Payment," A Smart Card Alliance Transportation Council White Paper (40 pages), Mar. 2008.

Saush, "Getting information from an EMV chip card with Java," Sep. 8, 2006, WordPress, pp. 1-13.

* cited by examiner

SYSTEMS AND METHODS FOR FRAUD PREVENTION IN MOBILE APPLICATION VERIFICATION DEVICE ENROLLMENT PROCESS

FIELD OF THE DISCLOSURE

The present disclosure is generally related to electronic fraud detection, and more specifically to implementation of optimized mobile application verification for device eligibility determination.

BACKGROUND

The mobile application verification (MAV) process is an authentication process for allowing users secure electronic access to high risk transactions. Once a source device, such as a mobile phone, is enrolled in a MAV process, the authentication system registers the device as a trusted source for initiating identity requests. In order to verify a validity of a source device initiating a MAV request, one or more device enrollment alerts are generated and transmitted to one or more user contacts identified for the specific account associated with the MAV request. Upon transmission of the alert, a waiting period is initiated to provide the user time to respond to the one or more alerts and report fraudulent devices. However, the mandatory (device stability) waiting period impedes accessibility of the MAV process while still involving security pitfalls that may be exploited to enroll a fraudulent device for MAV access.

These and other deficiencies exist. As such, there is need for an improved system and process for determining trust in a source device initiating a MAV request that is both secure and accessible.

DETAILED DESCRIPTION

The following description of exemplary embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Furthermore, the described features, advantages, and characteristics of the exemplary embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments. One skilled in the relevant art will understand that the described features, advantages, and characteristics of any embodiment can be interchangeably combined with the features, advantages, and characteristics of any other embodiment.

MAV process, as a key authentications method for facilitating user access to high risk transactions, is based on establishing trust that a source device (e.g., a mobile device) from which a MAV enrollment request initiated, is being operated by a valid user (e.g., owner of an account tied to the MAV request.)

Figure 1:
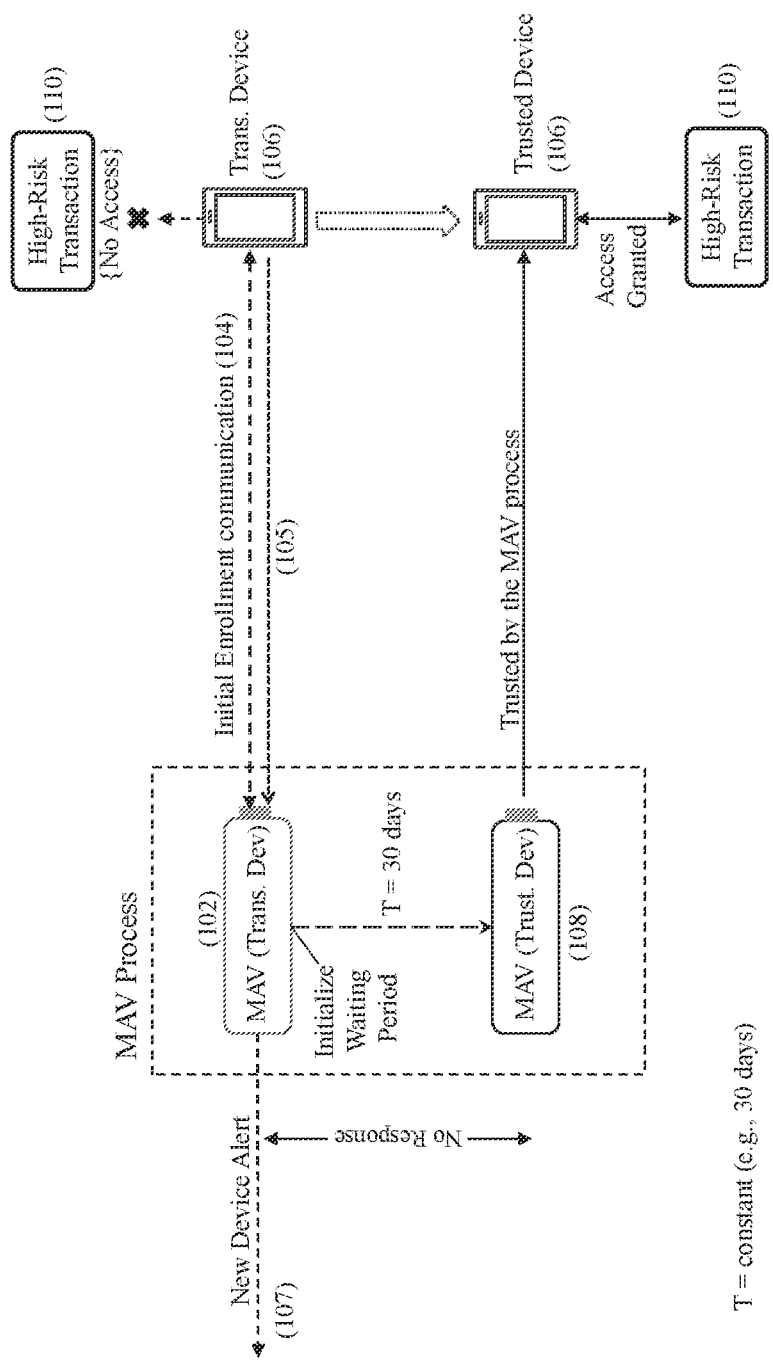
FIG. 1 illustrates an exemplary MAV process with a 30 day waiting time, in accordance with some embodiments of the present disclosure.

FIG. 1 illustrates an overview of an exemplary MAV enrollment process 100, implemented based on a mandatory waiting period (interchangeability referred to as device stability period for the purposes of the present disclosure). As described above, for the purpose of fraud prevention, one or more alerts may be generated in response to an incoming MAV device enrollment request (interchangeably referred to as the MAV request for the purposes of the present disclosure.) The device stability period represents a pre-specified time window for processing incoming responses from users reporting fraudulent activity and is implemented to ensure that a MAV enrollment request is not initiated fraudulently (e.g., from a device not associated with a valid account user)

Referring back to FIG. 1, a receiving MAV process thread 102 may establish an initial enrollment communication 104 with a transmitting device 106 as a source, and perform an initial authentication process based on verifying an initial user authentication data 105 (e.g., user personal identification number (PIN) and/or password) received from the transmitting device 106. Upon verifying the initial authentication data 105, a new device enrollment alert 107 may be transmitted to one or more user contacts associated with the specific user account for which an MAV access eligibility is requested. Following transmission of alert notification 107, a waiting period (e.g., time period T) may be initialized to monitor for incoming user responses and/or any other user fraud reports associated the specific user account tied to the initial MAV request (e.g., provided as part of the initial enrollment communication 104). In some examples the period T may correspond to a 30 days wait time, during which if no response or fraud report is received in connection with the specific user account, the MAV process may register the source transmitting device 106 as a trusted device (e.g., as shown by MAV process thread 108.) The transmitting device 106 may then be able to gain access to one or more secure operations and/or data records 110. In some examples, the transmitting device for wireless network communication with the MAV process, may correspond to a network-enabled computer such a user mobile device which can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Some embodiments of the present disclosure are directed to an improved device trust computation process (e.g., for establishing trust in a source device requesting MAV enrollment) which minimizes or potentially eliminates the enrollment waiting period, while reducing the risk of fraudulent MAV enrollments, thus streamlining the MAV device enrollment process from both user and system perspectives.

Figure 2:
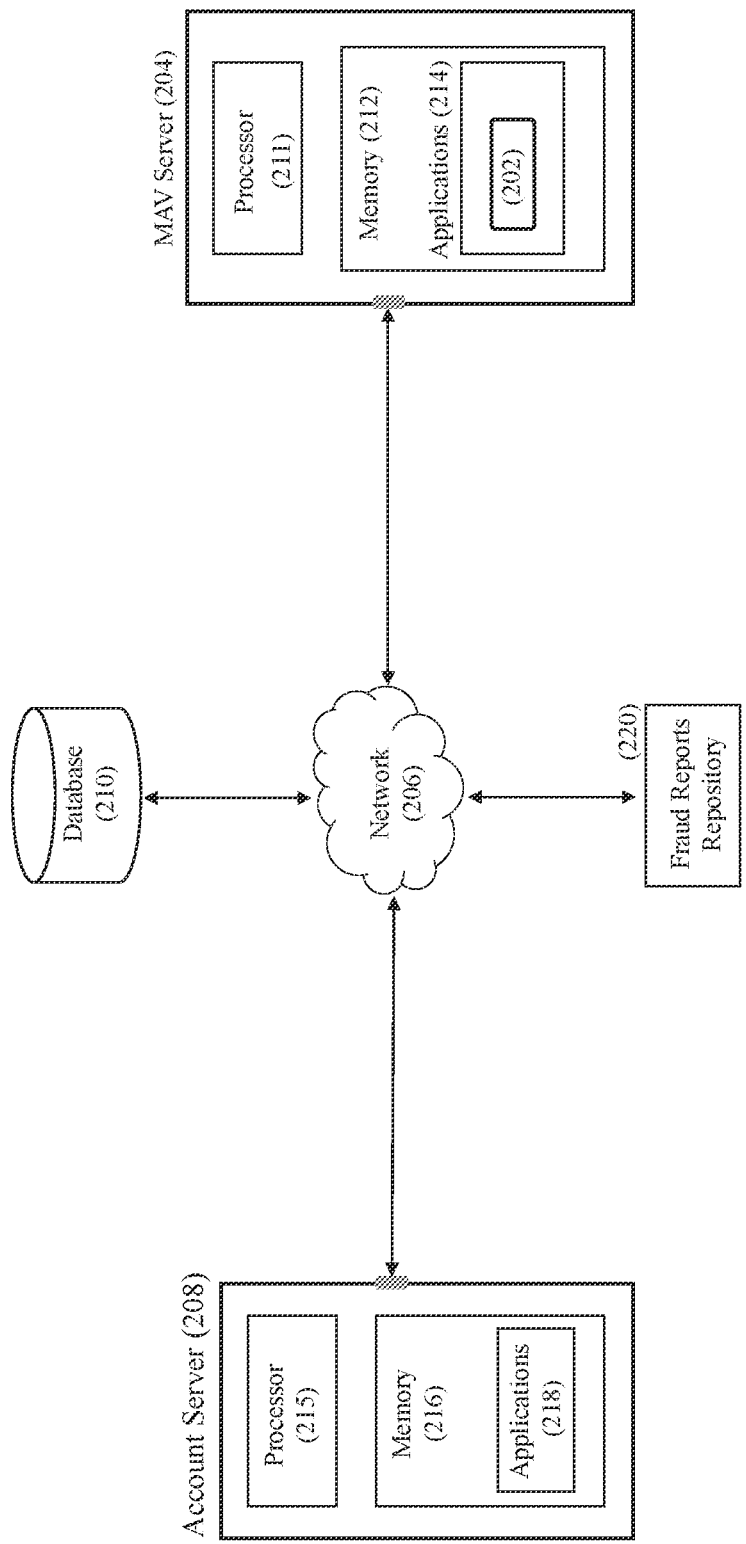
FIG. 2 illustrates an exemplary interaction between a contactless card and a mobile device, using short-range communication, to transmit secure authentication data for use in an MAV enrollment process, in accordance with some embodiments of the present disclosure.

In some embodiments, a device trust computational model, for determining a MAV device enrollment waiting period, may be implemented as a function of initial authentication strength and/or a set of computed historical trust factor. The computational model may be implemented as a process (e.g., process 202) running on an MAV server 204 as illustrated by the exemplary system implementation 200, illustrated in FIG. 2. The exemplary system implementation 200 further comprises, a network 206, an account server 208 a database 210 and/or a fraud reports repository 220. Although FIG. 2 illustrates single instances of components of system 200, system 200 may include any number of components.

The MAV server 204 may include one or more processors 211, and memory 212. Memory 212 may include one or more applications, such as applications 214, to enable performance of the functions and processes described herein. According to the exemplary embodiment 200, the computational model 202 may be supplemented with one or more machine learning (ML) routines and implemented as part of applications 214 stored on the MAV server 204. The MAV server 204 may be in data communication with any number of components of system 200. For example, MAV server 204 may be configured as a central system, server or platform to control and call various data at different times to execute a plurality of workflow actions such as the computation of input authentication strength factor (S1), optimally scaled weighing coefficients (W1, W2, W3) and trust parameter values (e.g., P1, P2, P3). MAV server 204 may be configured to connect to account server 208.

Account server 208 may be in data communication with the applications 214 running the ML-supplemented trust model 202. For example, the account server 208 may be in data communication with applications 214 via one or more networks 206. The MAV server 204 may transmit, for example from applications 214 executing thereon, one or more requests to account server 208. The one or more requests may be associated with retrieving data from the account server 208. Account server 208 may receive the one or more requests from MAV server 204. Without limitation, the MAV server 204 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device.

The MAV server 204 may include processing circuitry and may contain additional components, including processors, memories, error and parity/CRC checkers, data encoders, anticollision algorithms, controllers, command decoders, security primitives and tamper-proofing hardware, as necessary to perform the functions described herein. The MAV server 204 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the MAV sever that is available and supported by the MAV server, such as a touch-screen, keyboard, mouse, cursor-control device, touch-screen, microphone, digital camera, video recorder or camcorder. These devices may be used to enter information and interact with the software and other devices described herein.

The information used by the ML-supplemented trust model 202 running, for example, on the MAV server 204, may comprise one or more statistical data values associated with transactional activity corresponding to the target user account and/or information recorded by the transmitting device (e.g., linked to a device identifier for a source device transmitting a MAV request.) The statistical transaction data values may be determined by parsing and processing the historical transaction records retrieved across, for example, network 206. The historical transaction records may be retrieved from the account server 208 and/or one or more databases 210, with scaling factors and/or weighing coefficients computed based on training the computational model 202 with data retrieved from a fraud reports repository 220. The information used by the ML-supplemented trust model 202, that may be executing on the MAV server 204, may further comprise one or more initial user authentication data transmitted from a source device during an initial MAV enrollment communication. The ML-supplemented process 202 may determine a numerical strength factor associated with the initial user authentication data, and compute a trust value as a function of the numerical strength factor and the statistical data values derived from the historical transaction records of the user.

In some examples, network 206 may be one or more of a wireless network, a wired network or any combination of wireless network and wired network, and may be configured to connect to any one of components of system 200. For example, the MAV server 204 may be configured to connect to account server 208 via network 206. In some examples, network 206 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 206 may include, without limitation, telephone lines, fiber optics, IEEE Ethernet 902.3, a wide area network, a wireless personal area network, a LAN, or a global network such as the Internet. In addition, network 206 may support an Internet network, a wireless communication network, a cellular network, or the like, or any combination thereof. Network 206 may further include one network, or any number of the exemplary types of networks mentioned above, operating as a stand-alone network or in cooperation with each other. Network 206 may utilize one or more protocols of one or more network elements to which they are communicatively coupled. Network 206 may translate to or from other protocols to one or more protocols of network devices. Although network 206 is depicted as a single network, it should be appreciated that according to one or more examples, network 206 may comprise a plurality of interconnected networks, such as, for example, the Internet, a service provider's network, a cable television network, corporate networks, such as credit card association networks, and home networks.

As described with reference to FIG. 2, historical transactional records may be retrieved from one or more account servers (e.g., account server 208) associated with a user and parsed and processed with one or more machine learning routines to compute a fraud probability for an incoming MAV device enrollment request. As discussed, in accordance to some embodiments, the fraud probability may be computed as a function of the strength factor associated with the initial MAV request authentication data, and a set of optimally scaled trust parameter values computed from historical transaction records retrieved from one or more account servers (e.g., account server 208) associated with a target user account.

As shown in the exemplary system implementation 200, illustrated in FIG. 2, account server 208 may include one or more processors 215 coupled to memory 216. The account server 208 can be configured as a central system, server or platform to control and call various data at different times to execute a plurality of workflow actions. The account server 208 can be configured to connect to any component of system 200 via network 206. The account server 208 can be a dedicated server computer, such as bladed servers, or can be personal computers, laptop computers, notebook computers, palm top computers, network computers, mobile devices, wearable devices, or any processor-controlled device capable of supporting the system 200. While FIG. 2 illustrates a single account server 208, it is understood that other embodiments can use multiple servers or multiple computer systems as necessary or desired to support the users and can also use back-up or redundant servers to prevent network downtime in the event of a failure of a particular server.

The account server 208 can be in data communication with the processor 211 of the MAV server 204. For example, account server 208 can be in data communication with processor 211 of the MAV server 204 via one or more networks 206. The MAV server 204 may transmit one or more requests to the account server 208. The one or more requests can be associated with retrieving data from the account server 208, and may be generated in response to receiving an MAV enrollment request from a source device. The account server 208 can receive the one or more requests from any component of MAV server 204. The account server 208 can be configured to transmit the requested data to the processor 211 of the MAV server 204, the transmitted data being responsive to one or more requests.

The account server 208 can include a processor 215. The processor 215 can be, for example, one or more microprocessors. The processor 215 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The account server 208 may include one or more applications 218 comprising instructions for execution thereon. For example, the application can reside in memory 216 of account server 208 and can comprise instructions for execution on the account server 208. The application 218 of the account server 208 can be in communication with any components of system 200. For example, account server 208 can execute one or more applications that enable, for example, network and/or data communications with one or more components of system 200, transmit and/or receive data, and perform the functions and processes described herein. Without limitation, the account server 208 can be a network-enabled computer. As referred to herein, a network-enabled computer can include, but is not limited to a computer device, or communications device including, e.g., a server, a network appliance, a personal computer, a workstation, a phone, a handheld PC, a personal digital assistant, a thin client, a fat client, an Internet browser, or other devices. The functionality associated with the account server 208 may also be implemented on a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The account server 208 can include processing circuitry and can contain additional components, including processors, memories, error and parity/CRC checkers, data encoders, anticollision algorithms, controllers, command decoders, security primitives and tamper-proofing hardware, as necessary to perform the functions described herein. The account server 208 can further include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the account server that is available and supported by the account sever, such as a touch-screen, keyboard, mouse, cursor-control device, touch-screen, microphone, digital camera, video recorder or camcorder. These devices can be used to enter information and interact with the software and other devices described herein.

System implementation 200 can include one or more databases 210. The one or more databases 210 can comprise a relational database, a non-relational database, or other database implementations, and any combination thereof, including a plurality of relational databases and non-relational databases. In some examples, the databases 210 can comprise a desktop database, a mobile database, or an in-memory database. Further, the one or more databases 210 can be hosted internally by any component of system 200, such as the MAV server 204 and/or the account server 208. The one or more databases 210 can also be hosted externally to any component of the system 200, by a cloud-based platform, or in any storage device that is in data communication with the MAV server 204 and the account server 208. In some examples, the databases 210 can be in data communication with any number of components of system 200. For example, the account server 208 can be configured to retrieve the data requested by processor 211 of the MAV server 204 from the databases 210. Account server 208 can be configured to transmit the received data from databases 210 to the processor 211 via network 206, the received data being responsive to the transmitted one or more requests. In other examples, the processor 211 can be configured to transmit one or more requests for the requested data to the databases 210 via network 206.

One aspect of the disclosed systems and methods is directed to enhancing fraud prevention features of the MAV enrollment process by incorporating addition layers of authentication security in the corresponding back-end validation process. In some embodiments, the additional layer of security may be provided via an interaction with a contactless one-time password (OTP) card. The card-stored authentication credentials may be read by the (MAV requesting) source device by bringing the contactless card within Near-Field Communication (NFC) proximity of the source device. The read operation may facilitated a NFC-based transfer of encrypted card and/or user-specific credentials stored on the contactless OTP card to a reader of the source device (e.g., mobile device equipped with a NFC reader and application). The card-stored authentication credentials may then be provided, by the source device, as initial authentication data for evaluation by a MAV enrollment process.

Figure 3:
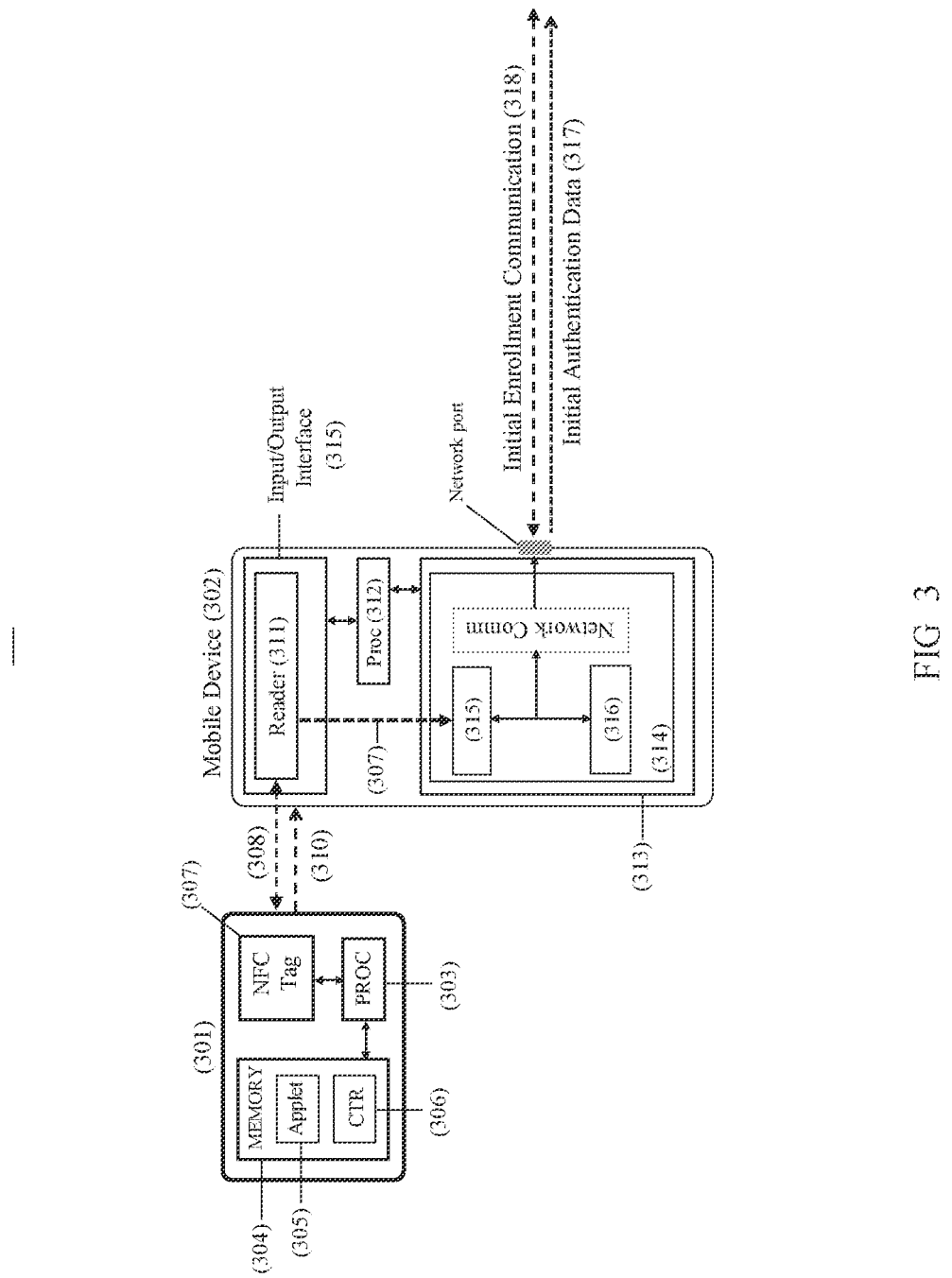
FIG. 3 illustrates an exemplary implementation for integration of an encrypted OTP password from a contactless card, as initial authentication data, in an MAV enrollment process, in accordance with some embodiments of the present disclosure.

FIG. 3 illustrates an exemplary implementation 300 leveraging a contactless OTP card authentication signal to reduce the probability of a fraudulent MAV request, which may subsequently reduce the waiting period for ensuring source device stability. FIG. 3 illustrates an overview of the interaction between a mobile device 302 and a contactless OTP card 301 associated with a user.

The contactless OTP card 301 may comprise an integrated processor 303 and memory 304 that may store, for example, user identifying and/or authenticating information as near field communication (NFC) transmittable data (e.g., NFC Data Exchange Format (NDEF)). The integrated memory 304 may store one or more applets 305 that may be communicatively coupled to one or more applications (e.g. application 315) running on the mobile device 302 (e.g., a user communication and/or computing device) and/or one or more applications executing on a remote authentication server (e.g., applications 218 executing on the account server 208.) The card-integrated memory 304 may also store an application transaction counter 306 to keep track of a proper sequence of operations associated with an authentication transaction conducted using the contactless OTP card 301. The contactless OTP card 301 may further comprise a Near Field Communication (NFC) interface 307 to facilitate an NFC communication with an NFC reader (e.g., reader component 311 of the mobile device 302). The (encrypted) user identification information may then be directly captured by the reader component 311 of the mobile device 302 by bringing the contactless OTP card 301 within an NFC range of the mobile device 302 (e.g., by tapping the contactless OTP card on a reader of a user mobile device) to initiate a direct read and subsequent authentication of user identification information stored, as NFC transmittable data, on the contactless OTP card 301.

The mobile device 302, configured for wireless communication with the contactless OTP card 301 via a short-range wireless connection (e.g., an NFC link 308) and network communication with the MAV server 204 and/or account server 208, may correspond to a network-enabled computer which can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. The user mobile device 302 may include a reader 311 for communicating with the NFC tag 307 of the contactless OTP card 301, a processor 312, a memory 313 storing one or more applications 314, and an input/output interface 315 for receiving user-input data and providing output data (such as wireless data transmission to a remote server and/or display data to the user). The processor 312 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein The proximity-based communication between the mobile device 302 and the contactless card 301 may be enabled across a NFC link 308 which is established as the contactless OTP card 301 enters an NFC field generated by, for example, the reader component 311 of the mobile device 302. An NFC tag 307 on the contactless card 304 may then communicate with the mobile device 302 when in NFC proximity of the mobile device reader 311. A corresponding user application 315 running on the mobile device 302 may receive and process the encrypted OTP signal 310. The NFC field can be generated by a mobile device (e.g., a smartphone), a point-of-sale device, or other devices. The encrypted OTP signal 310, retrieved by the mobile application 315, may correspond to card-stored authentication credentials and/or a connectivity status of the NFC link 308, which conveys either an active or an inactive status signifying that the contactless OTP card 301 is present or not present within proximity of the mobile device 302. In some embodiments, the encrypted OTP signal 310 may be combined with data retrieved from one or more other mobile applications (e.g. global positioning system application 316), prior to transmission as initial authentication data 317 during an initial enrollment communication 318. The integration of a user-provided encrypted OTP authentication signal 310 in the MAV enrollment process is further illustrated in FIG. 4.

Figure 4:
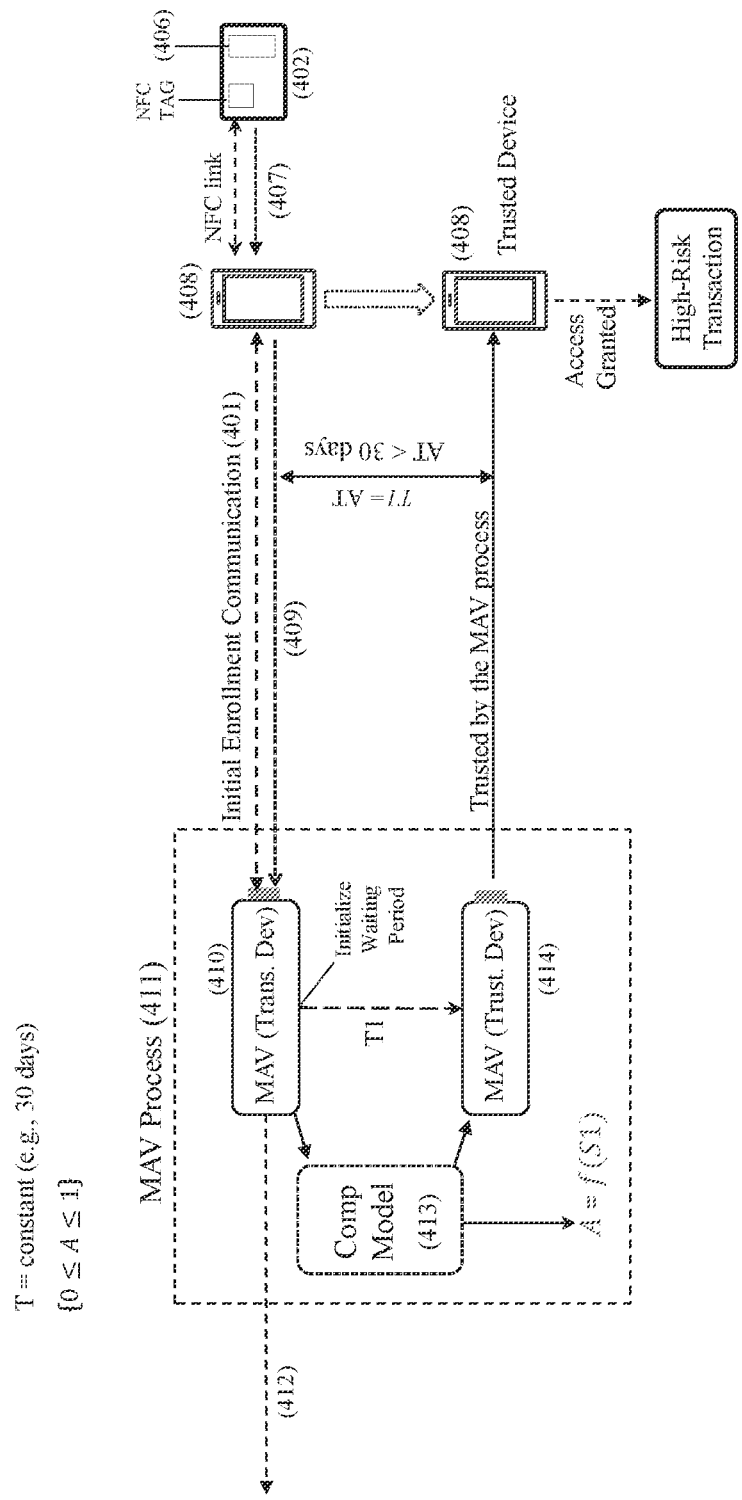
FIG. 4 illustrates an exemplary computational model for enhancing MAV fraud prediction based on analysis of recorded historical transaction data, in accordance with some embodiments of the present disclosure.

FIG. 4 illustrate an exemplary implementation 400 which integrates various user-provided authentication signals in the initial authentication data during the initial MAV enrollment communication 401. In some embodiments, the computation of the waiting time (T) may be performed as a function of the strength factor associated with the initial authentication data. In such embodiments, integration of stronger forms of authentication data, during the initial MAV enrollment process, may reduce or eliminate the standard waiting period (T) without compromising the security of the MAV process. In this regard, the exemplary MAV device enrollment process 400, illustrated in FIG. 4, leverages a contactless OTP authentication card 402 to incorporate an encrypted one time password (OTP) signal 407 generated from card-specific data 406 securely stored on the contactless card 402, in the initial enrollment communication 318. The card-transmitted encrypted OTP data 407 may be decrypted and verified by a receiving application on the mobile device 408, prior to being provided as initial authentication data 409 to a receiving MAV process thread 410, that may be running as part of the MAV process 411, for example, on a remote MAV server.

Upon verifying the initial authentication data 409, a new device alert 412 may be generated for the transmitting device 408, as shown in FIG. 4. As described in accordance to some embodiments, a computational model 413 may be invoked for determining a waiting period designated for monitoring a user response to the new device alert 412 and/or any other user fraud reports associated with the user account tied to the initial MAV request. Accordingly, the exemplary MAV process 411, in addition to verifying the validity of the initial authentication data, may further evaluate a strength factor (e.g., S1) associated with the initial authentication data 409 and compute a device stability (waiting) period (e.g., T1) as a function of the strength factor (e.g. T1=f(S1)). In some embodiments, the computation of a modified device stability period T1 may correspond to generation of a scaling factor (e.g., parameter A) for modifying the standard waiting period T as a function of the strength factor associated with the initial authentication data 409. This is illustrated in FIG. 4 by the expressions A=f(S1) and T1=AT which represents the new modified waiting period. Upon completion of the modified waiting period T1, the MAV process thread 414 may register the source transmitting device 408 as a trusted device.

In accordance to some embodiments, the MAV process 411 may apply one or more computational models 413 to compute the new waiting period T1 as a decreasing function of the strength factor (e.g., S1) associated with the initial authentication data 409. For example, computational model may compute a coefficient A for scaling the standard waiting time period T based on a determined strength factor associated with the initial authentication data 409. The duration of the waiting time may then be modified from (T=30 days) to (AT≤30 days). In some embodiments the coefficient may have a value that ranges from zero to one. For example, a value of one may correspond to very low strength initial authentication data for which a full thirty days waiting time period may be required (e.g., A×T=T) and a value of zero may correspond to a very strong authentication data for which a waiting period is not requires (e.g., A×T=0).

In some embodiments, a numerical value may be assigned to the scaling parameter A based on a set of pre-specified rules. For example, the set of pre-specified rules may assign a relatively higher value to encrypted device-stored authentication data (e.g., generated by an OTP authentication card) as compared to unencrypted memory-based authentication data (e.g., a PIN or password provided by a user.) For example the computational model may determine that an incoming authentication data associated with an encrypted OTP contactless card transmission in conjunction with a 2 day waiting period may be a more effective indicator of device stability than a simple user PIN and/or password transmission with a 30 day waiting period.

Figure 5:
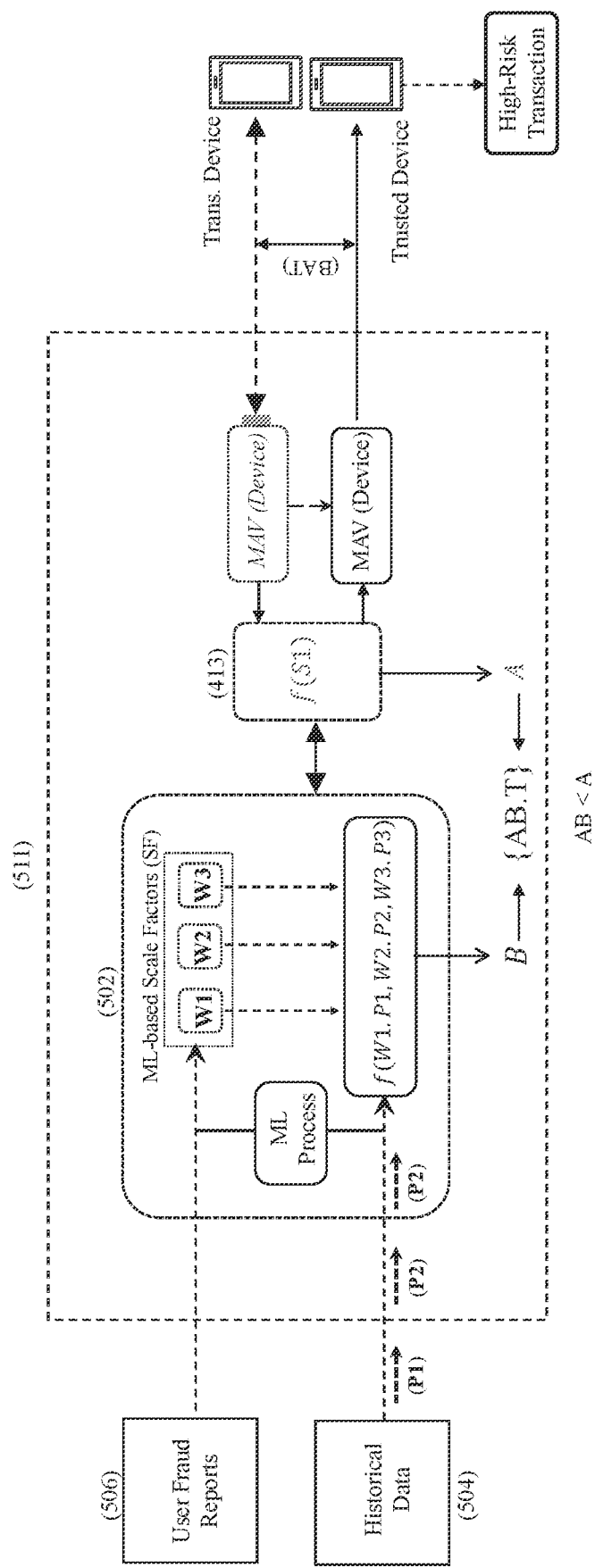
FIG. 5 illustrates an exemplary system implementation incorporating an improved MAV fraud prevention functionality, in accordance with some embodiments of the present disclosure.

In accordance to some embodiments of the present disclosure, the evaluation of a strength factor (e.g., S1) associated with various user-provided authentication inputs, may be supplemented with further analysis of historical data records to implement a more accurate fraud detection. The historical data may correspond to transactional data previously recorded in connection with the target user account (e.g., the user account tied to the MAV request) and/or the source transmitting device (e.g., as identified by an associated device identifier). FIG. 5 illustrates an exemplary implementation 500 which supplements the aforementioned approach based on evaluation of the user authentication input data (e.g., as performed by the computational model 413) with a number of device trust parameters computed from historical transactional records (e.g., as illustrated by process 511 which combines the computational model 413, for factoring input data authentication strength, with a historical trust score computation process 502, to further enhance the determination of a fraud detection probability)

As described above with respect to one aspect of the present disclosure, determination of a fraud probability may be reflected in the scaling of the 30 days MAV enrollment waiting period. Fraud probability computation may be based on a strength factor of user-provided authentication data and one or more (historical) trust parameters derived from historical transaction data. The historical trust parameters may be associated with factors such as quantity and quality of authentication challenges cleared, quantity and quality of authentication challenges failed, recorded user interaction history (e.g., recorded, for example, by the client mobile application running on the transmitting device, behavioral biometric measurements, device attributes (e.g., jailbroken status, operating system, etc.) and global positioning system (GPS) location data retrieved from the transmitting device. Trust factor parameters may then be used as inputs into a machine learning model and/or a rule-based system that determines a MAV eligibility risk score (e.g., probability of a fraudulent MAV request).

With reference to the exemplary implementation 500, illustrated in FIG. 5, the one or more trust parameter values may be determined from the historical records associated with the user account and prior data recorded for the transmitting device, by the receiving MAV server. The exemplary trust parameters (e.g., P1, P2, P3), illustrated in FIG. 5, correspond to a number of previous authentication requests associated with the transmitting device (based on determined device identifier) and/or the target user account for which the MAV request is received (e.g. P1), a number of previous successful challenges associated with the transmitting device and/or the target user account (e.g. P2), and a period of time elapsed since the most recent successful challenge associated with the transmitting device and/or the target user account (e.g., P3). A value for these parameters may be computed by analyzing previously recorded data received in association with the transmitting device as well as historical transaction records associated with the target user account. Another criteria may be associated with a number of previous authentication requests, as well as a number of previous successful challenges, associated with the user account that were initiated by the transmitting device. In some embodiments the value for a trust parameter, corresponding to the number of previous successful challenges, may be scaled based on a strength factor associated with each of previous successful challenges.

As shown in FIG. 5, the computational model 413, for computing a device-stability related waiting period as a function of the authentication strength, may be further supplemented with a machine learning (ML) model and/or process 502 for computing a set of historical trust scores from historical data records 504. Historical data records may corresponds to archived and real-time user transaction records and user activity related data generated by one or more mobile application executing on the user's mobile device. The ML model 502 may be trained on user provided fraud reports 506 (e.g., reports of a stolen devices and/or compromised user accounts that may be tied to a user device) in order to determine a select set of optimal trust parameters (e.g., P1, P2, P3) deemed to be most effective in predicting a probability of a valid/fraudulent MAV request. In some embodiments, historical data records may be provided in conjunction with reported fraud report data for training the ML model. The ML model 502 may be further trained to optimally determine one or more coefficient or weight values (e.g., W1, W2, W3) for the selected trust parameters. In some embodiment, a second scale factor (e.g., parameter B) may be computed by the ML-based trust model 502, as a function of a set of optimally scaled trust parameter values (e.g., W1P1, W2P2, W3P3). In some embodiments, the second scale factor B may be combined with the scale factor A (derived by the computational model 413 as a function of the input authentication data) to further optimize the trade-off between the length of the device-stability related waiting period and the security of the MAV process.

As discussed above, the exemplary system, method and computer-accessible medium can utilize machine learning to compute a set of optimally scaled trust parameters and data values. The exemplary machine learning can utilize information from reported fraud data and historical transaction and user-activity related data to make the determination, and various exemplary models can be generated (e.g., for computing trends in user transactional and behavioral patterns, as well as trust factor predictions based on the computed trends). The exemplary system, method and computer-accessible medium can then apply the generated models to effectively compute a fraud probability associated with a MAV request and accordingly modify a generated enrollment response.

The predictive models described herein can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

The exemplary system, method and computer-accessible medium can utilize various neural networks, such as convolutional neural networks (CNNs) or recurrent neural networks (RNNs), to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output).

RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The models described herein may be trained on one or more training datasets, each of which may comprise one or more types of data. In some examples, the training datasets may comprise previously-collected data, such as data collected from previous uses of the same type of systems described herein and data collected from different types of systems. In other examples, the training datasets may comprise continuously-collected data based on the current operation of the instant system and continuously-collected data from the operation of other systems. In some examples, the training datasets can include previous predictions for the instant system and other types of system, and may further include results data indicative of the accuracy of the previous predictions. In accordance with these examples, the predictive models described herein may be trained prior to use and the training may continue with updated data sets that reflect additional information.

Figure 6:
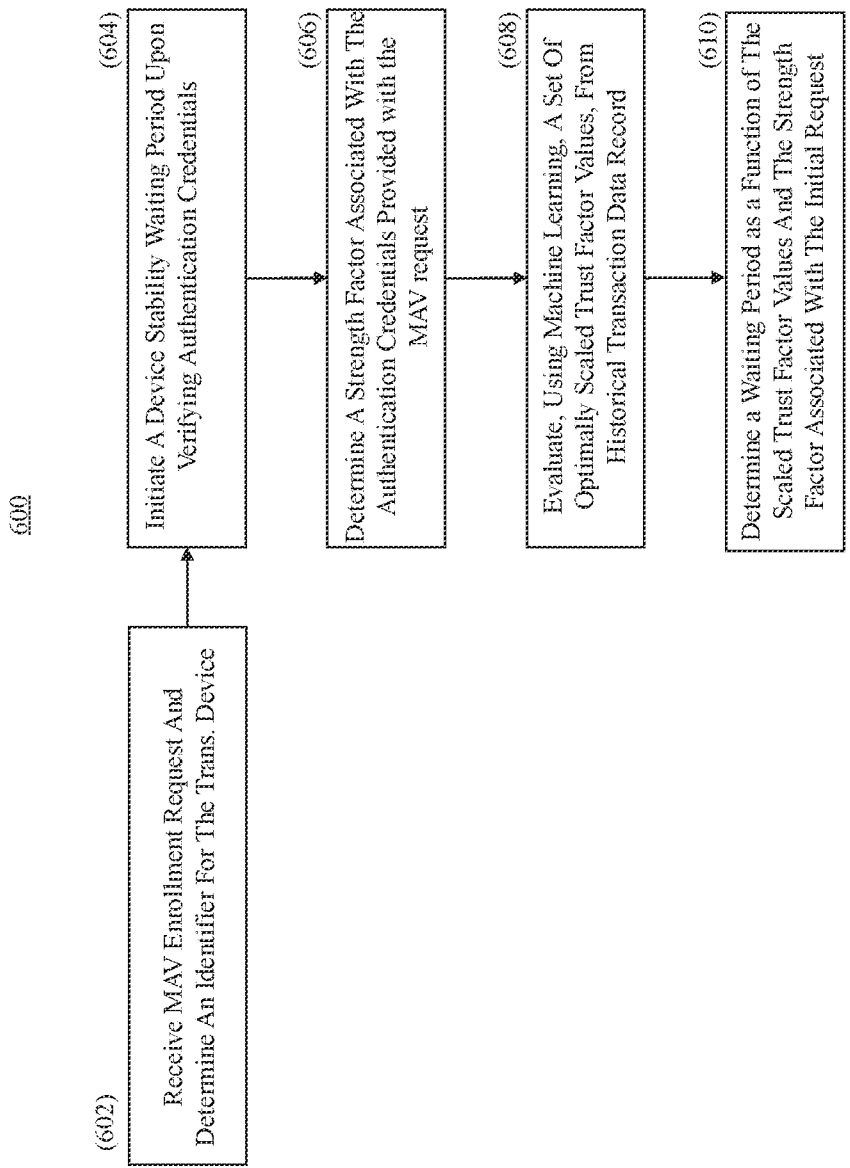
FIG. 6 illustrates an exemplary operational flow diagram for an improved implementation of fraud prevention in an MAV enrollment process, in accordance with some embodiments of the present disclosure.

FIG. 6 illustrates an exemplary operational flowchart 600 for optimizing the MAV device enrollment process. An initial operational step, in the exemplary process flow 600, may correspond to receiving an electronic MAV enrollment request and determining a device identifier for a source device associated with the request (step 602). The MAV enrollment request may be followed by the transmission of one or more authentication credentials requested, for example, by the receiving MAV server. Upon verifying the received authentication credentials (corresponding to a specific user account) from the source (transmitting) device, an MAV device enrollment alert may be transmitted to a user device and/or an email account, that may be registered with the specific user account. The Alert may correspond to a text notification, a push notification, an email, and/or any type of electronic notification that may be transmitted to a computing device associated with the user. Upon conducting an initial verification of the authentication credentials and subsequent transmission of the MAV device enrollment alert, the receiving MAV server may trigger a waiting period for any incoming alert response from a user associated with the target user account, as shown in step 604.

In some embodiments, an initial value for the waiting period may be determined as a decreasing function of authentication strength associated with the authentication credentials provided during the MAV request. As such, at step 606, a strength factor associated with the authentication credentials may be determined by a computational model. The determination of an authentication strength value may be based on a static assignment of a numerical value to various forms of authentication data such as, user PIN and/or password, encrypted OTP signal transmitted from a contactless card, etc. For example an encrypted OTP signal may be assigned a greater value than an authentication signal that includes a user PIN and/or password. In some embodiments, the computational model may comprise a machine learning (ML) component for computing a value representing the authentication strength factor.

In some embodiments, one or more trust parameters and/or corresponding scale factors (e.g., coefficient values for the trust parameters) may be statically specified by a user. The trust parameters may also be determined by the ML component of the computational model based on a predictive analysis of the historical transaction records associated with the target user account. In some embodiments, one or more coefficient values, for optimally scaling the value of the trust parameters, may be computed from the historical data records using the ML-based predictive model, as noted in step 608. The predictive model may be trained against user provided fraud reports to optimally scale each of the trust parameter values. The optimally scaled trust parameter values may then be used by the computational model to appropriately modify the initial waiting period computed as a function of the strength factor associated with the user provided authentication data. In some embodiments the strength factor associated with the user provided authentication data may be processed as an input trust parameter by the computational model (supplemented with one or more ML routines), and a waiting period may be computed as a function of an augmented set of trust parameters (e.g., including authentication strength parameter S1 as well as one or more historical trust parameters), as shown in step 610.

In some embodiments, the operation of the computational model may be associated with calculation of a fraud probability value for the MAV request. The waiting period may then be determined as a function of the fraud probability value. For example, a smaller fraud probability value may correspond to a shorter waiting time. In one example, a fraud probability value below a specific threshold may correspond to a zero wait time. In another example, a fraud probability value above a specific threshold may correspond to the rejection of the enrollment request as fraudulent, by the receiving MAV server.

Figure 7:
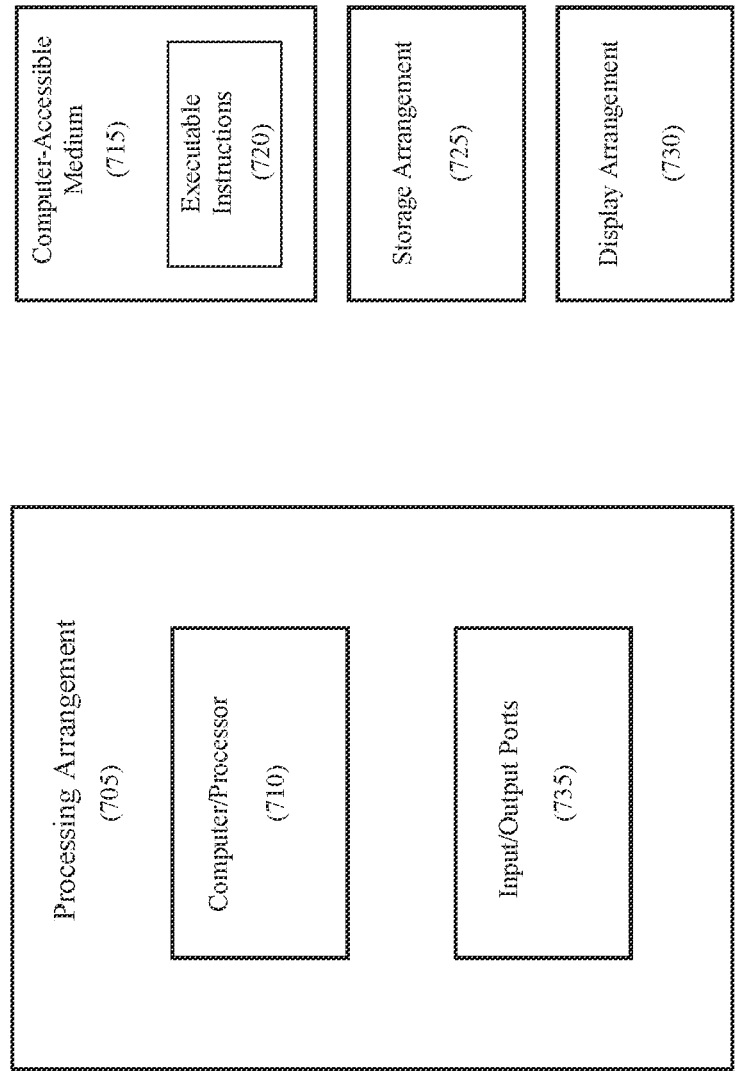
FIG. 7 illustrated an exemplary block diagram of an exemplary system, in accordance with some embodiments of the present disclosure.

FIG. 7 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement 705 that may be configured for predictive computation of a valid device enrollment probability, associated with a MAV enrollment request, and automation of an enrollment response, accordingly). Such processing and/or computing arrangement 705 can be, for example entirely or a part of, or include, but not limited to, a computer and/or processor 710 that can include, for example one or more microprocessors, and use instructions stored on a computer-accessible medium (e.g., RAM, ROM, hard drive, or other storage device).

As shown in FIG. 7, for example a computer-accessible medium 715 (e.g., as described herein above, a storage device such as a hard disk, floppy disk, memory stick, CD-ROM, RAM, ROM, etc., or a collection thereof) can be provided (e.g., in communication with the processing arrangement 705). The computer-accessible medium 715 can contain executable instructions 720 thereon. In addition or alternatively, a storage arrangement 725 can be provided separately from the computer-accessible medium 715, which can provide the instructions to the processing arrangement 705 so as to configure the processing arrangement to execute the exemplary procedures, processes, and methods, as described herein above, for example.

Further, the exemplary processing arrangement 705 can be provided with or include an input and/or output ports 735, which can include, for example a wired network, a wireless network, the internet, an intranet, a data collection probe, a sensor, etc. As shown in FIG. 7, the exemplary processing arrangement 705 can be in communication with an exemplary display arrangement 730, which, according to certain exemplary embodiments of the present disclosure, can be a touch-screen configured for inputting information to the processing arrangement in addition to outputting information from the processing arrangement, for example. Further, the exemplary display arrangement 730 and/or a storage arrangement 725 can be used to display and/or store data in a user-accessible format and/or user-readable format.

As used herein, the term "card" is not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club). Instead, it is understood that the present disclosure includes cards having any purpose, account association, or issuing entity.

Systems and methods described herein can provide secure, retrieval of sensitive user information or enabling streamlined communication and processing of sensitive user information for example, for facilitating secure electronic transactions. Once a valid authorization response from an authenticated user has been established, the automated data retrieval and transfer systems and processes can permit, without limitation, financial transactions (e.g., credit card and debit card transactions), account management transactions (e.g., card refresh, card replacement, and new card addition transactions), membership transactions (e.g., joining and departing transactions), point of access transactions (e.g., building access and secure storage access transactions), transportation transactions (e.g., ticketing and boarding transactions), and other transactions In some aspects, the techniques described herein relate to a method for improving a MAV device enrollment by optimizing the trade-off between security and accessibility aspects of the process (e.g., reduced or eliminate the waiting time without compromising security), the method including: determining a device identifier for a transmitting device in response to a mobile application verification (MAV) enrollment request initiated by the transmitting device, the enrollment request being associated with a user account; initiating a device stability waiting period upon verifying one or more authentication credentials provided by the transmitting device, the one or more authentication credentials being associated with the user account; verifying a strength factor associated with the one or more authentication credentials, wherein the device stability waiting period, is a decreasing function of the strength factor; applying a computational model to determine a length of the device stability waiting period as a function of the strength factor; retrieving a value for one or more trust parameters based on historical records associated with the user account and the transmitting device, the one or more trust parameters including: a number previous authentication requests associated with one or more of the transmitting device and the user account, a number of previous successful challenges associated with one or more of the transmitting device and the user account, and a period of time elapsed since a most recent successful challenge associated with one or more of the transmitting device and the user account; determining a scaling factor for each of the one or more trust parameters using a machine learning process, wherein the value for each of the one or more trust parameters is scaled based on a corresponding scale factor, thereby generating one or more scaled values; inputting the one or more scaled values into the computational model for modifying the length of the device waiting period based on the one or more scaled values; and generating a fraud probability value for the MAV enrollment request initiated by the transmitting device, wherein the fraud probability value is directly proportional to the device stability waiting period.

In some aspects, the techniques described herein relate to a method, wherein the verifying a strength factor of the one or more authentication credentials corresponds to determining whether the one or more authentication credentials corresponds to at least one selected from the group of a short message service (SMS) message, a user password and a contactless card one-time password (OTP) authentication.

In some aspects, the techniques described herein relate to a method, wherein the one or more trust parameters further include a number of previous authentication requests associated with the user account that were initiated by the transmitting device.

In some aspects, the techniques described herein relate to a method, where the one or more trust parameters further include a number of previous successful challenges associated with the user account that were initiated by the transmitting device.

In some aspects, the techniques described herein relate to a method, wherein the value for a trust parameter, corresponding to the number of previous successful challenges, is scaled based on a strength factor associated with each of previous successful challenges.

In some aspects, the techniques described herein relate to a method, further including capturing device specific data from the transmitting device, wherein the specific data includes a malware presence and a device fingerprint.

In some aspects, the techniques described herein relate to a method, wherein a fraud probability value above a predetermined threshold value indicates ineligibility of the transmitting device for the MAV enrollment.

In some aspects, the techniques described herein relate to a method, wherein the number of previous authentication requests initiated by the transmitting device is determined based on a predetermined period of time.

In some aspects, the techniques described herein relate to a method, wherein the number of previous authentication requests associated with the user account is determined based on a predetermined period of time.

In some aspects, the techniques described herein relate to a method, wherein the value for each of the one or more trust parameters associated with the number of previous successful challenges is scaled based on an authentication strength factor associated with each of the previous successful challenges.

In some aspects, the techniques described herein relate to a method, wherein the machine learning model is trained based on a plurality of user fraud reports associated with a plurality of user accounts.

In some aspects, the techniques described herein relate to a system for optimizing valid device enrollment, the system including a computer hardware arrangement configured to: determine a device identifier for a transmitting device in response to a mobile application enrollment request initiated by the transmitting device, the enrollment request being associated with a user account; initiate a device stability waiting period upon verifying one or more authentication credentials provided by the transmitting device, the one or more authentication credentials being associated with the user account; verify a strength factor associated with the one or more authentication credentials, wherein the device stability waiting period is a decreasing function of the strength factor; apply a computational model to determine a length of the device stability waiting period as a function of the strength factor; retrieve a value for one or more trust parameters based on historical records associated with the user account and the transmitting device, the one or more trust parameters including: a number of previous authentication requests associated with one or more of the transmitting device and the user account; a number of previous successful challenges associated with one or more of the transmitting device and the user account; and a period of time elapsed since a most recent successful challenge associated with one or more of the transmitting device and the user account; determine a scaling factor for each of the one or more trust parameters using a machine learning process, wherein the value for each of the one or more trust parameters is scaled based on a corresponding scale factor, thereby generating one or more scaled values; input the one or more scaled values into the computational model to modify the length of the device waiting period based on the one or more scaled values; and generate a fraud probability value for the MAV enrollment request initiated by the transmitting device, wherein the fraud probability value is directly proportional to the device stability waiting period.

In some aspects, the techniques described herein relate to a system, wherein the one or more trust parameters further include a number of previous authentication requests associated with the user account that were initiated by the transmitting device.

In some aspects, the techniques described herein relate to a system, wherein the value for a trust parameter, corresponding to the number of previous successful challenges, is scaled based on a strength factor associated with each of previous successful challenges.

In some aspects, the techniques described herein relate to a system, wherein the computer hardware arrangement is further configured to generate a device ineligibility notification in response to a fraud probability value that is above a predetermined threshold.

In some aspects, the techniques described herein relate to a system, wherein the computer hardware arrangement is further configured to scale the value for each of the one or more trust parameters associated with the number of previous successful challenges, based on a strength factor associated with each of the previous successful challenges.

In some aspects, the techniques described herein relate to a system, wherein the computer hardware arrangement is further configured to train the machine learning process based on the plurality of user fraud reports associated with a plurality of user accounts.

In some aspects, the techniques described herein relate to a non-transitory computer-accessible medium including instructions for execution by a computer hardware arrangement, wherein, upon execution of the instructions the computer hardware arrangement is configured to perform procedures including: determining a device identifier for a transmitting device in response to a mobile application verification (MAV) enrollment request initiated by the transmitting device, the enrollment request being associated with a user account; initiating a device stability waiting period upon verifying one or more authentication credentials provided by the transmitting device, the one or more authentication credentials being associated with the user account; verifying a strength factor associated with the one or more authentication credentials, wherein the device stability waiting period, is a decreasing function of the strength factor; applying a computational model to determine a length of the device stability waiting period as a function of the strength factor; retrieving a value for one or more trust parameters based on historical records associated with the user account and the transmitting device, the one or more trust parameters including: a number previous authentication requests associated with one or more of the transmitting device and the user account, a number of previous successful challenges associated with one or more of the transmitting device and the user account, and a period of time elapsed since a most recent successful challenge associated with one or more of the transmitting device and the user account; determining a scaling factor for each of the one or more trust parameters using a machine learning process, wherein the value for each of the one or more trust parameters is scaled based on a corresponding scale factor, thereby generating one or more scaled values; inputting the one or more scaled values into the computational model for modifying the length of the device waiting period based on the one or more scaled values; and generating a fraud probability value for the MAV enrollment request initiated by the transmitting device, wherein the fraud probability value is directly proportional to the device stability waiting period.

In some aspects, the techniques described herein relate to a non-transitory computer-accessible medium, further including instructions for scaling the value of a trust parameter, corresponding to the number of previous successful challenges, based on a strength factor associated with each of previous successful challenges.

In some aspects, the techniques described herein relate to a non-transitory computer-accessible medium, further including instructions for training the machine learning process based on a plurality of user fraud reports associated with a plurality of user accounts.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for optimizing probability of valid device enrollment performed by a computer hardware arrangement, the method comprising:
determining a device identifier for a transmitting device in response to a mobile application verification (MAV) enrollment request initiated by the transmitting device, the enrollment request being associated with a user account;
initiating a device stability waiting period upon verifying one or more authentication credentials provided by the transmitting device, the one or more authentication credentials being associated with the user account;
verifying a strength factor associated with the one or more authentication credentials, wherein the device stability waiting period, is a decreasing function of the strength factor;
applying a computational model to determine a length of the device stability waiting period as a function of the strength factor;
retrieving a value for one or more trust parameters based on historical records associated with the user account and the transmitting device, the one or more trust parameters comprising:
a number previous authentication requests associated with one or more of the transmitting device and the user account,
a number of previous successful challenges associated with one or more of the transmitting device and the user account, and
a period of time elapsed since a most recent successful challenge associated with one or more of the transmitting device and the user account;
determining a scaling factor for each of the one or more trust parameters using a machine learning process, wherein the value for each of the one or more trust parameters is scaled based on a corresponding scale factor, thereby generating one or more scaled values;
inputting the one or more scaled values into the computational model for modifying the length of the device waiting period based on the one or more scaled values; and
generating a fraud probability value for the MAV enrollment request initiated by the transmitting device, wherein the fraud probability value is directly proportional to the device stability waiting period.

2. The method of claim 1, wherein the verifying a strength factor of the one or more authentication credentials corresponds to determining whether the one or more authentication credentials corresponds to at least one selected from a group of a short message service (SMS) message, a user password and a contactless card one-time password (OTP) authentication.

3. The method of claim 1, wherein the one or more trust parameters further comprise a number of previous authentication requests associated with the user account that were initiated by the transmitting device.

4. The method of claim 1, where the one or more trust parameters further comprise a number of previous successful challenges associated with the user account that were initiated by the transmitting device.

5. The method of claim 1, wherein the value for a trust parameter, corresponding to the number of previous successful challenges, is scaled based on a strength factor associated with each of the previous successful challenges.

6. The method of claim 1, further comprising capturing device specific data from the transmitting device, wherein the device specific data comprises a malware presence and a device fingerprint.

7. The method of claim 1, wherein a fraud probability value above a predetermined threshold value indicates ineligibility of the transmitting device for the MAV enrollment.

8. The method of claim 1, wherein the number of previous authentication requests initiated by the transmitting device is determined based on a predetermined period of time.

9. The method of claim 1, wherein the number of previous authentication requests associated with the user account is determined based on a predetermined period of time.

10. The method of claim 1, wherein the value for each of the one or more trust parameters associated with the number of previous successful challenges is scaled based on an authentication strength factor associated with each of the previous successful challenges.

11. The method of claim 1, wherein the machine learning process is trained based on a plurality of user fraud reports associated with a plurality of user accounts.

12. A system for optimizing valid device enrollment, the system comprising a computer hardware arrangement configured to:
- determine a device identifier for a transmitting device in response to a mobile application verification (MAV) enrollment request initiated by the transmitting device, the MAV enrollment request being associated with a user account;
- initiate a device stability waiting period upon verifying one or more authentication credentials provided by the transmitting device, the one or more authentication credentials being associated with the user account;
- verify a strength factor associated with the one or more authentication credentials, wherein the device stability waiting period is a decreasing function of the strength factor;
- apply a computational model to determine a length of the device stability waiting period as a function of the strength factor;
- retrieve a value for one or more trust parameters based on historical records associated with the user account and the transmitting device, the one or more trust parameters comprising:
  - a number of previous authentication requests associated with one or more of the transmitting device and the user account;
  - a number of previous successful challenges associated with one or more of the transmitting device and the user account; and
  - a period of time elapsed since a most recent successful challenge associated with one or more of the transmitting device and the user account;
- determine a scaling factor for each of the one or more trust parameters using a machine learning process, wherein the value for each of the one or more trust parameters is scaled based on a corresponding scale factor, thereby generating one or more scaled values;
- input the one or more scaled values into the computational model to modify the length of the device stability waiting period based on the one or more scaled values; and
- generate a fraud probability value for the MAV enrollment request initiated by the transmitting device, wherein the fraud probability value is directly proportional to the device stability waiting period.

13. The system of claim 12, wherein the one or more trust parameters further comprise a number of previous authentication requests associated with the user account that were initiated by the transmitting device.

14. The system of claim 12, wherein the value for a trust parameter, corresponding to the number of previous successful challenges, is scaled based on a strength factor associated with each of the previous successful challenges.

15. The system of claim 12, wherein the computer hardware arrangement is further configured to generate a device ineligibility notification in response to a fraud probability value that is above a predetermined threshold.

16. The system of claim 12, wherein the computer hardware arrangement is further configured to scale the value for each of the one or more trust parameters associated with the number of previous successful challenges, based on a strength factor associated with each of the previous successful challenges.

17. The system of claim 12, wherein the computer hardware arrangement is further configured to train the machine learning process based on a plurality of user fraud reports associated with a plurality of user accounts.

18. A non-transitory computer-accessible medium comprising instructions for execution by a computer hardware arrangement, wherein, upon execution of the instructions the computer hardware arrangement is configured to perform procedures comprising:
- determining a device identifier for a transmitting device in response to a mobile application verification (MAV) enrollment request initiated by the transmitting device, the enrollment request being associated with a user account;
- initiating a device stability waiting period upon verifying one or more authentication credentials provided by the transmitting device, the one or more authentication credentials being associated with the user account;
- verifying a strength factor associated with the one or more authentication credentials, wherein the device stability waiting period, is a decreasing function of the strength factor;
- applying a computational model to determine a length of the device stability waiting period as a function of the strength factor;
- retrieving a value for one or more trust parameters based on historical records associated with the user account and the transmitting device, the one or more trust parameters comprising:
  - a number previous authentication requests associated with one or more of the transmitting device and the user account,
  - a number of previous successful challenges associated with one or more of the transmitting device and the user account, and
  - a period of time elapsed since a most recent successful challenge associated with one or more of the transmitting device and the user account;
- determining a scaling factor for each of the one or more trust parameters using a machine learning process, wherein the value for each of the one or more trust parameters is scaled based on a corresponding scale factor, thereby generating one or more scaled values;
- inputting the one or more scaled values into the computational model for modifying the length of the device stability waiting period based on the one or more scaled values; and
- generating a fraud probability value for the MAV enrollment request initiated by the transmitting device, wherein the fraud probability value is directly proportional to the device stability waiting period.

19. The non-transitory computer-accessible medium of claim 18, further comprising instructions for scaling the value of a trust parameter, corresponding to the number of previous successful challenges, based on a strength factor associated with each of the previous successful challenges.

20. The non-transitory computer-accessible medium of claim 18, further comprising instructions for training the machine learning process based on a plurality of user fraud reports associated with a plurality of user accounts.

* * * * *